May 8, 1928.  
G. A. DALTON  
1,668,586  
FLEXIBLE COUPLING  
Filed Jan. 28, 1925  
2 Sheets-Sheet 1

Inventor  
George A. Dalton.  
by his Attorneys  
Howson & Howson

May 8, 1928.
G. A. DALTON
1,668,586
FLEXIBLE COUPLING
Filed Jan. 28, 1925
2 Sheets-Sheet 2
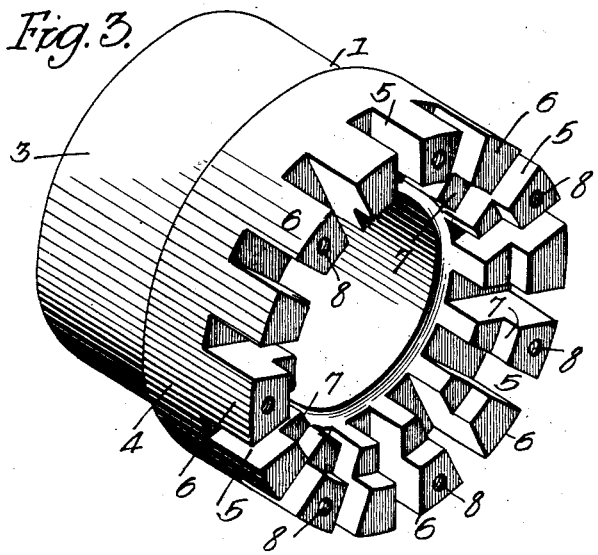
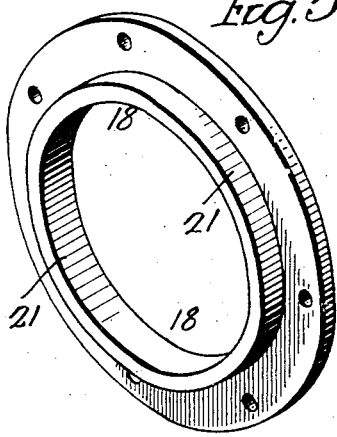
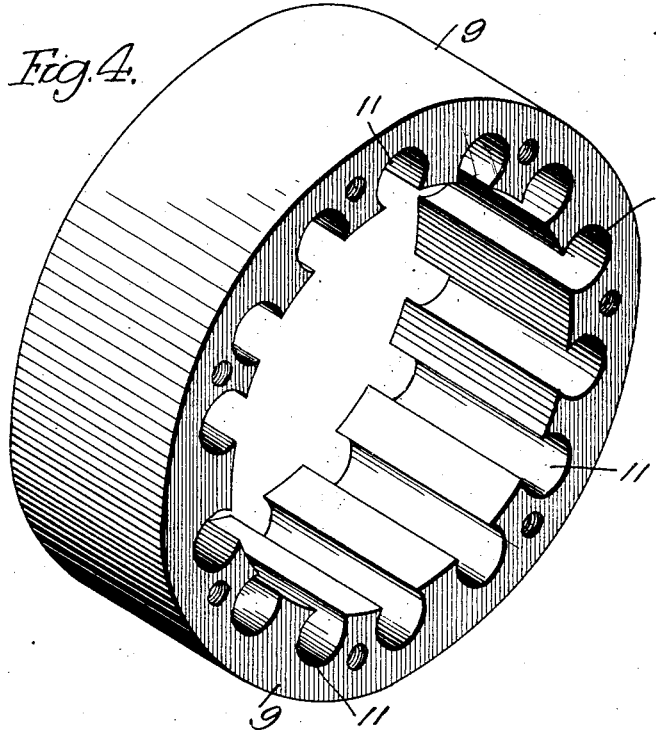
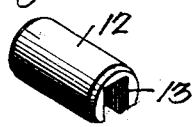
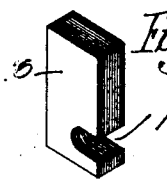
Inventor-
George A. Dalton.
by his Attorneys,
Howson & Howson Patented May 8, 1928.

1,668,586

UNITED STATES PATENT OFFICE.

GEORGE A. DALTON, OF HIGHLAND PARK, NEW JERSEY, ASSIGNOR TO JOHN WALDRON CORPORATION, OF NEW BRUNSWICK, NEW JERSEY, A CORPORATION OF NEW JERSEY.

FLEXIBLE COUPLING.

Application filed January 28, 1925. Serial No. 5,283.

This invention relates to flexible couplings, and the principal object of the invention is to provide a novel and improved flexible coupling adapted especially for high speeds and capable of accommodating excessive axial as well as parallel misalignments of the coupled shafts.

The present invention is characterized by the use of two coupling members adapted to be secured to the ends of the shafts to be connected; an intermediate floating member; and flexible elements extending substantially at right angles to the axes of the said coupling members and constituting a connection between the said members and the intermediate floating member and also a retainer for the latter.

A typical embodiment of my invention is illustrated in the attached drawings in which:

Fig. 3 is a view in perspectve of one of the coupling members which is attached to one of the shafts;

Fig. 4 is a view in perspective of the intermediate or floating member;

Fig. 5 is a view in perspective of one of the connector retaining flanges;

Fig. 6 is a view in perspective of one of the bearing elements, and

Fig. 7 is a view in perspective of one of the flexible connectors.

Figure 1:
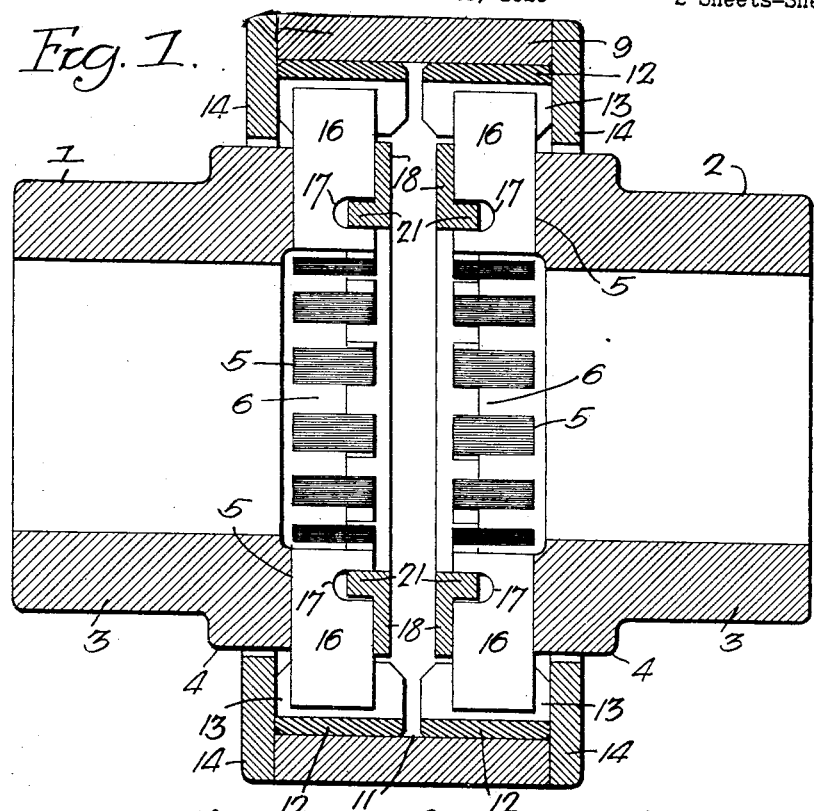
Figure 1 is a section through the assembled coupling.

With reference to the drawings, the coupling in the form illustrated comprises a pair of coupling members 1 and 2 which may be identical in form and which are adapted respectively for attachment to the shafts to be connected. One of these coupling members is illustrated in Fig. 3, and as therein illustrated comprises a sleeve portion 3 which fits over the end of the shaft and which may be keyed or otherwise secured to the shaft; and a part 4 of increased diameter which projects beyond the end of the shaft and is provided with a series of uniformly spaced radial slots 5 extending inwardly from the end face of the fitting. The tongues 6 formed by these slots are cut away at their inner corners, as illustrated at 7, and alternate ones of the tongues are provided with tapped holes 8, the function of the recesses 7 and the tapped holes 8 being set forth hereinafter.

Figure 2:
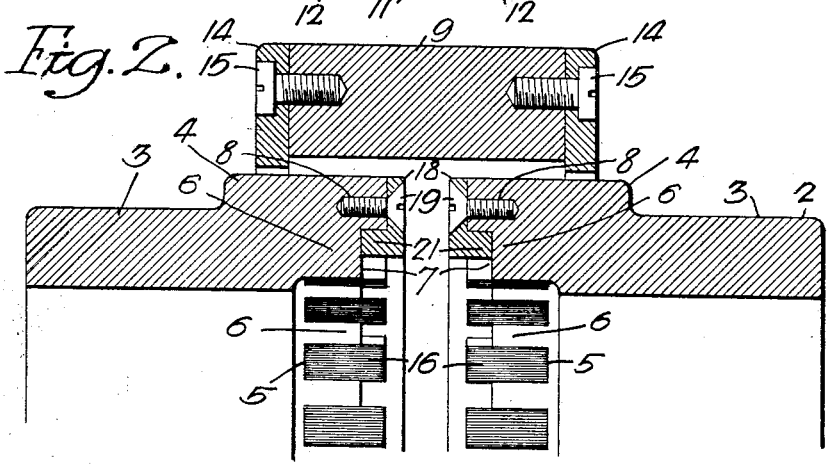
Fig. 2 is a fragmentary section on a different section line illustrating details of the coupling.

The coupling further comprises an annular member 9 which as shown in Figs. 1 and 2 is adapted to occupy a position outside of and in overlapping relation with the parts 4 of the coupling members 1 and 2. This annular member 9 is provided in its inner face with a series of semi-circular recesses 11 evenly spaced and corresponding in number to the slots 5 of the members 1. The recesses 11 are adapted to receive substantially cylindrical bearing elements 12, shown in perspective in Fig. 6, each provided with a longitudinal rectangular recess 13 extending inwardly from the periphery. To retain the elements 12 in the recesses 11, annular face plates 14, 14, are provided, see Figs. 1 and 2, which are secured by means of bolts or screws 15 to the side faces of the member 9. Since the recesses 11 are so formed that the cylindrical elements 12 must be passed in from either end of the recesses, these plates are sufficient to prevent dislodgment of the elements. The plates also function as a retainer for a lubricant in the inner face of the torque ring 9 insuring proper lubrication of the bearing cylinders 12.

The slots 5 of the members 1 and 2 are adapted to receive substantially rectangular connector elements 16, shown in perspective in Fig. 7, and built up in the present instance of a plurality of flat flexible steel plates or shims. Annular retaining plates 18 are provided which are adapted to be secured to the faces of the members 1 and 2 by means of screws 19, see Fig. 2, which pass through the said plates 18 and into the tapped holes 6 in the members 1 and 2, and each of the annular plates 18 has a flange 21 extending transversely from its inner edge into recesses 17 in the edges of the connector elements 16, as shown in Fig. 1, whereby the latter are retained in the slots 5 with one end projecting beyond the periphery of the members 1 and 2. Cutting back the inner edges of the tongues 6 at 7, as previously described, provides the space for the flanges 21. The projecting portions of the connector elements 16 in the assembled coupling project into and lodge neatly within the recesses 13 of the bearing elements 12, there being no direct contact between the floating member 9 and the said elements 16, although the latter support and prevent dislodgment of the said floating member 9 from its proper position relative to the coupling members 1 and 2.

I claim:

1. In a flexible coupling, the combination with driving and driven rotary members, each of said members having in an end face thereof a plurality of substantially radial slots; a plurality of resilient torque transfer elements adapted to occupy said slots and each provided with a recess extending inwardly from its outer edge, a retainer for the elements comprising a member detachably secured to the said rotary member and having a projection adapted to enter the recesses in said transfer elements, and a third rotary member operatively connected with the transfer elements of both the driving and driven members.

2. In a flexible coupling, the combination with driving and driven rotary members having adjacent end faces, of a torque transferring ring surrounding and in overlapping relation with said members, a series of substantially cylindrical recesses in the inner face of said ring and extending axially thereof, substantially cylindrical slotted keeper elements adapted to occupy and oscillate in said recesses, substantially radial resilient torque transferring elements carried by said members and projecting into the slots in said keepers, and members at the side faces of said ring at least one of which is detachably connected thereto and adapted to prevent displacement of the keeper elements from the ends of the recesses which they occupy and to retain a lubricant at the inside of said ring.

3. In a flexible coupling, the combination with driving and driven rotary members, each of said members having in an end face thereof a plurality of substantially radial slots, and said end face being countersunk to provide an annular recess therein, a plurality of resilient torque transfer elements adapted to occupy said slots and each provided with a recess extending inwardly from its outer edge and in alignment with said annular recess, a retainer for the elements comprising a member detachably secured to the said face of said rotary member and having a flange adapted to enter the said annular recesses of the rotary member and also the recesses of said transfer elements, and a third rotary member operatively connected with the transfer elements of both the driving and driven members.

GEORGE A. DALTON.